(12) United States Patent
Takekawa et al.

(10) Patent No.: US 8,086,861 B2
(45) Date of Patent: Dec. 27, 2011

(54) INFORMATION PROCESSING TERMINAL AND STATUS NOTIFICATION METHOD

(75) Inventors: Hiroshi Takekawa, Tokyo (JP); Hisashi Takayama, Tokyo (JP)

(73) Assignee: Panasonic Corporation, Osaka (JP)

( * ) Notice: Subject to any disclaimer, the term of this patent is extended or adjusted under 35 U.S.C. 154(b) by 479 days.

(21) Appl. No.: 12/305,126

(22) PCT Filed: Jun. 14, 2007

(86) PCT No.: PCT/JP2007/062035
§ 371 (c)(1),
(2), (4) Date: Dec. 16, 2008

(87) PCT Pub. No.: WO2007/148602
PCT Pub. Date: Dec. 27, 2007

(65) Prior Publication Data
US 2009/0271637 A1 Oct. 29, 2009

(30) Foreign Application Priority Data
Jun. 21, 2006 (JP) .................................. 2006-171727

(51) Int. Cl.
*H04L 9/00* (2006.01)
*H04L 9/32* (2006.01)
(52) U.S. Cl. ........ 713/176; 713/189; 713/193; 713/194; 726/26
(58) Field of Classification Search .................. 713/176, 713/189–190, 192–194; 380/277; 726/26–27, 726/30, 1
See application file for complete search history.

(56) References Cited

U.S. PATENT DOCUMENTS 6,757,832 B1 * 6/2004 Silverbrook et al. ......... 713/194
2006/0015719 A1 * 1/2006 Herbert et al. ................ 713/164

FOREIGN PATENT DOCUMENTS

| JP | 2001-337600 A | 12/2001 |
| JP | 2002-536757 A | 10/2002 |
| JP | 2003-016098 A | 1/2003 |
| JP | 2004-334362 A | 11/2004 |
| JP | 2005-025617 A | 1/2005 |

OTHER PUBLICATIONS

International Search Report for PCT/JP2007/062035.

* cited by examiner

*Primary Examiner* — Hosuk Song
(74) *Attorney, Agent, or Firm* — Pearne & Gordon LLP

(57) ABSTRACT

The present invention aims at providing an information processing terminal, a status notification system, and a status notification method that can protect both privacy and security when a status of the information processing terminal is notified to a server. An information processing terminal 10 has a disclosure/nondisclosure determination section 1001 that determines a notifiable server for each entry; a log concealing section 1002 that conceals an entry; a multi-log measurement section 1003 that commands to update hashes as to a plurality of parties; a log configuration section 1004 that configures a log directed at a notified party and that causes performance of signing action; a verification request section 1005 that requests verification; a policy storage section 1006 that stores a policy used for determining a party that can be notified; and a log storage section 1007 for storing the entry. The information processing terminal 10 commands accumulation, into a hash, of entries subjected to processing suitable for each notified party, such as concealing operation.

14 Claims, 14 Drawing Sheets

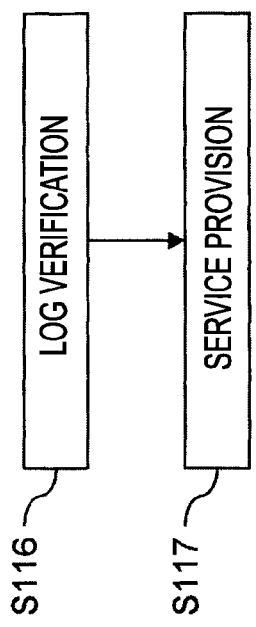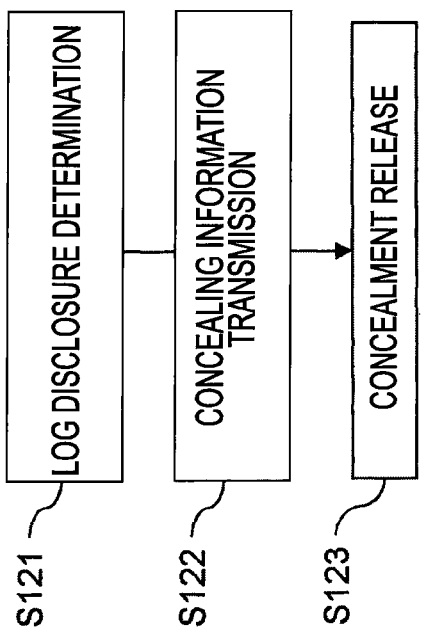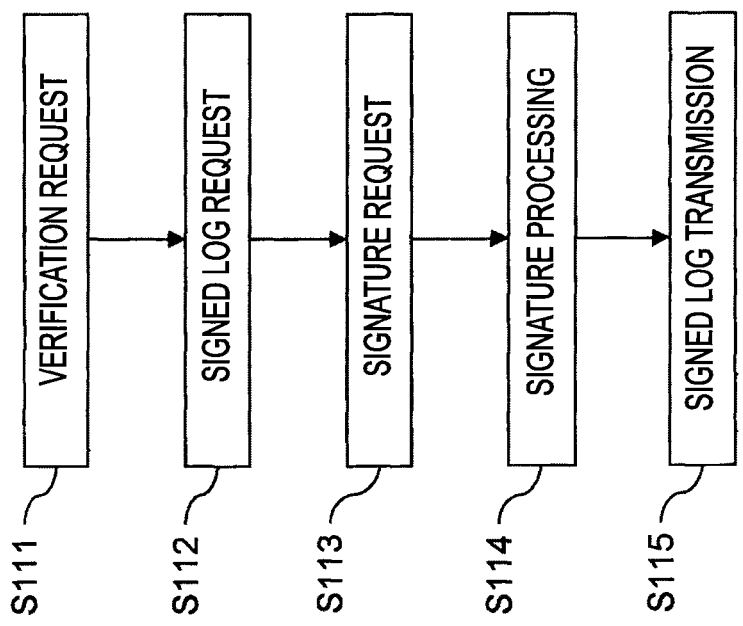

FIG. 8A
EXAMPLE ENTRY

ID: 12345
Date: 2006/01/01 00:00:00
Action: Load
Name: drm-b.dll
Hash: 123456789ABCDEF123456789ABCDEF
Version: 1.0

FIG. 8B
EXAMPLE CONCEALED ENTRY

ID: 12345
Date: 2006/01/01 00:00:00
ConcealedHash: ABCDEF123456789ABCDEF123456789
Action: Load
Name: drm-b.dll
Hash: 123456789ABCDEF123456789ABCDEF
Version: 1.0

(CONCEALED FIELDS)

FIG. 8C
EXAMPLE POLICY

ServiceName: Music Service A
ServiceFiles: drm-a.sys, drm-a.dll, drm-a.exe
Server: drm.example.com

FIG. 8D
EXAMPLE POLICY

ServiceName: Music Service B
ServiceFiles: drm-b.sys, drm-b.dll, drm-b.exe
Server: drm.example.org

EXAMPLE SOFTWARE STACK

EXAMPLE SOFTWARE STACK

INFORMATION PROCESSING TERMINAL AND STATUS NOTIFICATION METHOD

TECHNICAL FIELD

The present invention relates to a technique for notifying a sever that offers various services by way of a network about the status of an information processing terminal that receives the services, such as a personal computer.

BACKGROUND ART

Services offered by way of a network have recently become expensive and diversified as provision of copyrighted works such as music and a video, exchange of confidential corporate information, and online banking. In order to address the thus-diversified services, many pieces of client software are installed in an information processing terminal such as a personal computer, a portable terminal, a cellular phone, and a digital home appliance. The pieces of software are provided with a function for protecting expensive information as well as a function of receiving a service.

As a value acquired by means of such a service increases, damages stemming from avoidance of limitations imposed by software by means of a method for making unauthorized modifications on software in an information processing terminal become more serious. There is an increasing necessity for verifying whether or not unauthorized modifications have been made to client software in an information processing terminal which is about to be provided with a service and an execution environment including an operating system in which the client software runs.

In order to address the necessity, a technique for accurately reporting information about software that is executed in an information processing terminal has been proposed by the TCG (Trusted Computing Group), or the like. The technique proposed by the TCG is disclosed in; for instance, Patent Document 1.

FIG. 14 illustrates a system in which a verification server 1410 verifies software executed in an information processing terminal 1400 according to a technique proposed by the TCG, or the like. The information processing terminal 1400 is equipped with a tamper-resistant module called the TPM (Trusted Platform Module) 1401. The module protects a private key and a hash value, which are important information in view of security, and safely performs processing that is important in terms of security.

The information processing terminal 1400 computes a hash of a code of software, such as a BIOS, a Loader, or a Kernel, executed since start of a CPU 1402, and causes the TPM 1401 to store a computed hash. The TPM 1401 can submit a digitally-signed hash to a verification server 1410 that is located outside for verifying the status of the information processing terminal. Hence, the verification server 1410 compares the hash with a correct hash, thereby proving that the information processing terminal is in a state where a correct code has been executed.

A target that adopts a hash that has been made more prevalent, and includes data (hereinafter called an entry) representing information about an event, such as launching of software or loading of a driver. In the case of this form, a program name and a hash of a code of the program can be put into entries, and contents of information that concatenate respective entries with each other (hereinafter called an "event log" or simply as a "log") become an object to be guaranteed.

Specifically, when executing code of software such as a BIOS, a Loader, a Kernel, App A, App B, the CPU 1402 of the information processing terminal 1400 computes respective hashes (hash computation 1421) and transmits the thus-computed hashes 1422 to the TPM 1401 and adds and stores an entry 1424 into the event log 1403. When provided with the transmitted hash 1422, the TPM 1401 concatenates an already-stored value with the thus-received value, executes hash computation to thus generate one hash, and stores the thus-generated hash into a PCR (Platform Configuration Register) 1404 (cumulative arithmetic processing 1423).

Even when data that become objects for tampering detection are increased later, the data, including a sequence thereof, can be guaranteed by means of one hash. Because a status is accumulated, the hash will be hereunder called a cumulative hash. Processing for computing a hash and accumulating the thus-computed hash will also be called measurement.

When the verification server 1410 verifies software running on the information processing terminal 1400, a challenge 1425 is first transmitted from the verification server 1410 to the information processing terminal 1400. The TPM 1401 concatenates the received challenge 1425 with a cumulative hash stored in a PCR 1404, subjects a resultant hash to digital signing (digital signature processing 1426), further concatenates a certificate with the event log 1403, and transmits a result as verification information 1427 to the verification server 1410.

The verification server 1410 first verifies a signature of the certificate, verifies the digital signature, checks an entry of the received event log 1403 against the entry registered in a verification data DB 1411, computes a cumulative hash again, checks a computation result against the cumulative hash included in the received verification information 1427, and checks the challenge 1425 against a challenge included in the received verification information 1427, thereby verifying the software running on the information processing terminal 1400.

As mentioned above, more detailed verification can be carried out by means of notification of an event log as well as a signed cumulative hash. The reason for this is that the cumulative hash enables verification of the event log, as well.

In reality, software is made by a combination of several hierarchical levels. There is a case where pieces of software are identical with each other in terms of lower levels but different from each other in terms of upper levels, and hence a variety of combinations are present. Therefore, if one cumulative hash is applied to all statuses, difficulty will be encountered in verification. For this reason, the TPM can retain a plurality of cumulative hashes, and sixteen registers from PCR0 to PCR15 are available. When transmitting a hash to the TPM, the CPU 1402 designates a cumulative hash to be updated by number (hereinafter called a "cumulative hash number").

Patent Document 1: JP-T-2002-536757

DISCLOSURE OF THE INVENTION

Problem that the Invention is to Solve

Although more detailed verification can be performed by means of notifying the verification server 1410 about an event log, the verification server 1410 can ascertain what software and network service are used by the user, which arouses a concern for leakage of privacy information. Hence, consideration must be taken into verification and security tradeoffs.

From the viewpoint of protection of privacy information, it is desirable that some of information to be notified can be deleted or concealed in accordance with a server that is a target to be notified of an execution status. However, in the known configuration, when a modification is made to an event log after updating of a cumulative hash, the event log is interpreted as having been tampered, and hence modification for deleting or concealing contents of an event log cannot be made.

The present invention resolves the problem of the known art and aims at providing an information processing terminal that can notify its own status in such a form as to enable detection of tampering of an event log while protecting privacy information.

Means for Solving the Problem

An information processing terminal of the present invention is an information processing terminal that provides a plurality of notified parties with notification of accumulation of entries indicating data that shows a status change, the information processing terminal including: a cumulative storage section that holds accumulation of entries used for detecting tampering of a log of an entry for each of the plurality of notified parties; a multi-log measurement section that commands to update, on the basis of one entry, a plurality of the accumulation of entries corresponding to the plurality of respective notified parties held in the cumulative storage section; and a verification request section that transmits to the notified party data containing data made by affixing an digital signature to the accumulation of entry held in the cumulative storage section corresponding to the notified party.

Accordingly, accumulation of a status is performed so as to enable detection of tampering for each notified party, and a result of accumulation can be notified to each of the parties of notification. Specifically, it is possible to prevent spoofing to an application A for pretending to run for a party which provides with a service on condition that the application A is running or to prevent spoofing to an application B for pretending to run for another party which provides with a service on condition that the application B is running.

An information processing terminal of the present invention is also an information processing terminal that provides a plurality of notified parties with notification of accumulation of entries indicating data that shows a status change, the information processing terminal including: a disclosure/nondisclosure determination section that determines whether or not notification of entry is allowed for each notified party; a log concealing section that generates a concealed entry; a log storage section for storing an entry; a cumulative storage section that holds accumulation of entries used for detecting tampering of a log for each notified party; a multi-log measurement section that commands, on the basis of a result of determination made by the disclosure/nondisclosure determination section to update accumulation of entries held by the cumulative storage section corresponding to a notified party for which the notification of entry is not allowed on the basis of the concealed entry, and to update accumulation of entries held by the cumulative storage section corresponding to a notified party for which the notification of entry is allowed on the basis of an unconcealed entry; a log configuration section that generates, on the basis of the result of determination made by the disclosure/nondisclosure determination section, a log to be sent to a notified party among the entries stored in the log storage section in such a way that: an entry which cannot be notified to the notified party becomes the concealed entry; and an entry which can be notified to the notified party becomes the unconcealed entry; and a verification request section that transmits, to the notified party, both data with a digital signature to accumulation of entries held by the cumulative storage section corresponding to a notified party and data containing the log generated by the log configuration section.

Accordingly, privacy information can be protected by changing contents of a transmission log for each notified party, and statuses can be accumulated so as to detect tampering. Specifically, the server can be, in a detectable manner, notified of tampering of an event log; namely, an event log of activation of an application A in spite of the fact that an application B is running as if it were the application A and an event log containing no evidence of activation of an application C (spyware or the like) that is actually running, and privacy information can be protected by changing concealment or non-concealment of each entry for each notified party.

The information processing terminal of the present invention is characterized in that the accumulation of entries held by the cumulative storage section is a cumulative hash of the entries.

Accordingly, the notified party can compute a cumulative hash from a received log and check the computed cumulative hash against the received entry, thereby verifying that the log is not tampered. Further, the size of memory required for the cumulative storage section in the information processing terminal can also be reduced.

A secure device of the present invention includes a cumulative storage section that holds accumulation of entries indicating data for showing a change in a status of the information processing terminal; a cumulative computing section that updates the accumulation of the entries held in the cumulative storage section; a signature processing section that signs the accumulation of the entries digitally; a verification section that verifies the data received from the information processing terminal; and a service server that offers a service when verification of the data performed by the verification section becomes successful.

Accordingly, privacy information is protected by changing contents of a transmission log for each notified party, and a notification is provided to a party, such as a server, so as to be able to detect tampering. Hence, the party can offer a service to an authorized user after verifying and ascertaining a notified log. Further, important personal information is stored in a secure device, and a service server having successfully performed verification allows only a verified application to acquire and operate personal information, so that personal information can be safely utilized.

The secure device of the present invention further includes an execution environment providing section that provides an execution environment; and an execution environment storage section that stores an execution environment.

Therefore, access control for allowing only an access from the execution environment provided by the secure device becomes possible. Specifically, software for an execution environment is provided from the secure device to the information processing terminal. Hence, in order to implement an execution environment on the information processing terminal, the secure device knows which software to be launched. A log received from the information processing terminal is checked, whereby a determination is made as to whether or not an access is from the execution environment provided by the secure device. Only an access from the execution environment provided by the secure device is allowed, thereby enabling enhancement of security.

In the secure device of the present invention, the verification section receives the accumulation of the entries held by the cumulative storage section by way of an internal interface of the secure device.

In this case, since the verification section receives the accumulation of entries by way of an internal interface of the secure device. Hence, contents of accumulation of entries can be trusted even when accumulation of entries is not provided with a digital signature. Since accumulation of entries does not require a digital signature, verification processing can be performed at high speed correspondingly.

The information processing terminal of the present invention further includes a verification section that verifies the data received from the verification request section; and a service server that offers a service when verification of the data performed by the verification section becomes successful.

Therefore, for instance, important personal information is stored in a service server, and a service server successfully performed verification allows only a verified application to acquire and operate the personal information, whereby personal information can be safely utilized by way of the information processing terminal.

In the information processing terminal of the present invention, the verification section receives the accumulation of the entries held by the cumulative storage section by way of an internal interface without involvement of the verification request section.

In this case, the verification section receives accumulation of entries by way of an internal interface, and hence contents of accumulation of entries can be trusted even when accumulation of entries is not provided with a digital signature. Since accumulation of entries does not require a digital signature, verification processing can be performed at high speed correspondingly.

In the multi-log measurement section of the information processing terminal of the present invention, when the notified parties differ from each other, a single piece of accumulation of entries is held in a case where cumulative values of the entries corresponding to the notified parties are equal to each other, and the single piece of accumulation of the entries is copied and pieces of the accumulation of the entries are individually updated, and the plurality of pieces of individually-updated accumulation of entries are held in a case where cumulative values of the entries corresponding to the notified parties become differed from each other.

Accordingly, excessive operation for updating accumulation of entries can be saved, and hence processing for updating accumulation of entries can be speeded up.

In the information processing terminal of the present invention, the log concealing section holds a master key to generate an encryption key from data generated by encrypting an entry ID with the master key and encrypt the entry with the encryption key.

Accordingly, information to be held for responding to a request for disclosure which will be provided later can be decreased, and hence the memory size of the information processing terminal can be diminished.

In the information processing terminal of the present invention, the log concealing section randomly generates an encryption key to encrypt the entry with the encryption key, and the information processing terminal further includes a concealing information storage section for storing the encryption key as concealing information. Therefore, an encryption key can be made random, and security can be enhanced.

In the information processing terminal of the present invention, the log concealing section deletes a part or entirety of contents of the entry. Therefore, contents which can be disclosed can be limited depending on a notified party, and security can be enhanced.

The information processing terminal of the present invention further includes an ID assigning section that assigns a different entry ID for each entry; a concealing information storage section for storing concealing information about concealment of the each entry in association with the entry ID; and a log disclosure determination section that, when disclosure of a concealed entry is requested, acquires or generates information, in correspondence with the entry ID, for releasing concealment, that determines whether or not to disclose the entry to a party that has made a request, and that passes the information for releasing the concealment or the entry released from the concealed state when determining the party to be eligible for disclosure.

Accordingly, an entry concealed at the time of notification can be released from a concealed state later as required. Hence, when a failure or fraud occurred in the information processing terminal is analyzed, the concealed information can be disclosed later, as required.

In the information processing terminal of the present invention, the log disclosure determination section submits the entry, which is released from the concealed state, to a user when determining whether or not to disclose the entry, thereby causing the user to designate whether or not to disclose the entry.

Accordingly, the user ascertains contents of an entry to be disclosed and can determine whether or not disclosure of the entry is appropriate. Hence, protection of privacy of the user can be enhanced.

A status notification method of the present invention is a method in which an information processing terminal notifies a server of a log that is a history of a change in status of own terminal, the method including steps of: generating the log while concealing an entry for a server to which the entry is not allowed to be notified; generating a signed log that is a concatenation of the log, data generated by affixing a digital signature to a cumulative hash corresponding to the log, and a certificate for verifying the digital signature; and transmitting the signed log to the server.

Accordingly, the server first can verify a digital signature, thereby ascertaining that a cumulative hash is not tampered. Further, the cumulative hash is checked, thereby making it possible to ascertain that a log of a received entry is not tampered. Privacy information is protected by changing, for each notified party, contents of a transmission log, and a notification can be provided to the server so that tampering can be detected.

Advantage of the Invention

The information processing terminal of the present invention protects privacy information by means of changing concealment or nonconcealment of each entry according to a server to be notified and can provide a notification so as to enable detection of tampering of an event log. Further, when receiving a service, the information processing terminal of the present invention can disclose concealed information later, if necessary, as in the case of analysis of a failure or fraud occurred in the information processing terminal.

BRIEF DESCRIPTION OF THE DRAWINGS

FIG. 6A is a descriptive view of notifying operation of an information processing terminal of the first embodiment of the present invention, FIG. 6B is a descriptive view of verifying operation of the server of the first embodiment of the present invention, and FIG. 6C is a descriptive view of operation for disclosing a concealed entry of the first embodiment of the present invention.

FIGS. 8A to 8D are descriptive views of a specific example of the first embodiment of the present invention.

DESCRIPTIONS OF THE REFERENCE NUMERALS

10 INFORMATION PROCESSING TERMINAL
1001 DISCLOSURE/NONDISCLOSURE DETERMINATION SECTION
1002 LOG CONCEALING SECTION
1003 MULTI-LOG MEASUREMENT SECTION
1004 LOG CONFIGURATION SECTION
1005 VERIFICATION REQUEST SECTION
1006 POLICY STORAGE SECTION
1007 LOG STORAGE SECTION
1008 ID ASSIGNING SECTION
1009 CONCEALING INFORMATION STORAGE SECTION
1010 LOG DISCLOSURE DETERMINATION SECTION
1011 SERVICE CLIENT
1012 VIRTUAL EXECUTION ENVIRONMENT
1013 VIRTUALIZATION SOFTWARE
1014 SYSTEM MEASUREMENT SECTION
20 SECURE MODULE
2001 CUMULATIVE CALCULATION SECTION
2002 SIGNATURE PROCESSING SECTION
2003 CUMULATIVE HASH STORAGE SECTION
30 SERVER
3001 VERIFICATION SECTION
3002 LOG DISCLOSURE SECTION
3003 LOG SAVING SECTION
3004 SERVER DB
3005 SERVICE SERVER
40 SECURE DEVICE
4001 CUMULATIVE COMPUTING SECTION
4002 SIGNATURE PROCESSING SECTION
4003 CUMULATIVE HASH STORAGE SECTION
4004 VERIFICATION SECTION
4005 SERVER DB
4006 SERVICE SERVER
4007 EXECUTION ENVIRONMENT PROVIDING SECTION
4008 EXECUTION ENVIRONMENT STORAGE SECTION

BEST MODES FOR CARRYING OUT THE INVENTION

Embodiments of the present invention will be described hereunder by reference to the drawings.

First Embodiment

A first embodiment of the present invention describes an information processing terminal that includes a tamper-resistant storage area and a secure module equipped with a processor. The terminal accumulates event logs from start of the terminal; updates a cumulative hash; and transmits data, which is generated by concatenating (i) an event log, (ii) digitally signed data pertaining to a cumulative hash corresponding to the event log, and (iii) a certificate for verifying the digital signature (the thus-concatenated data will be hereinafter called a "signed log"), to a server where the data are verified, thereby receiving a service.

Figure 1:
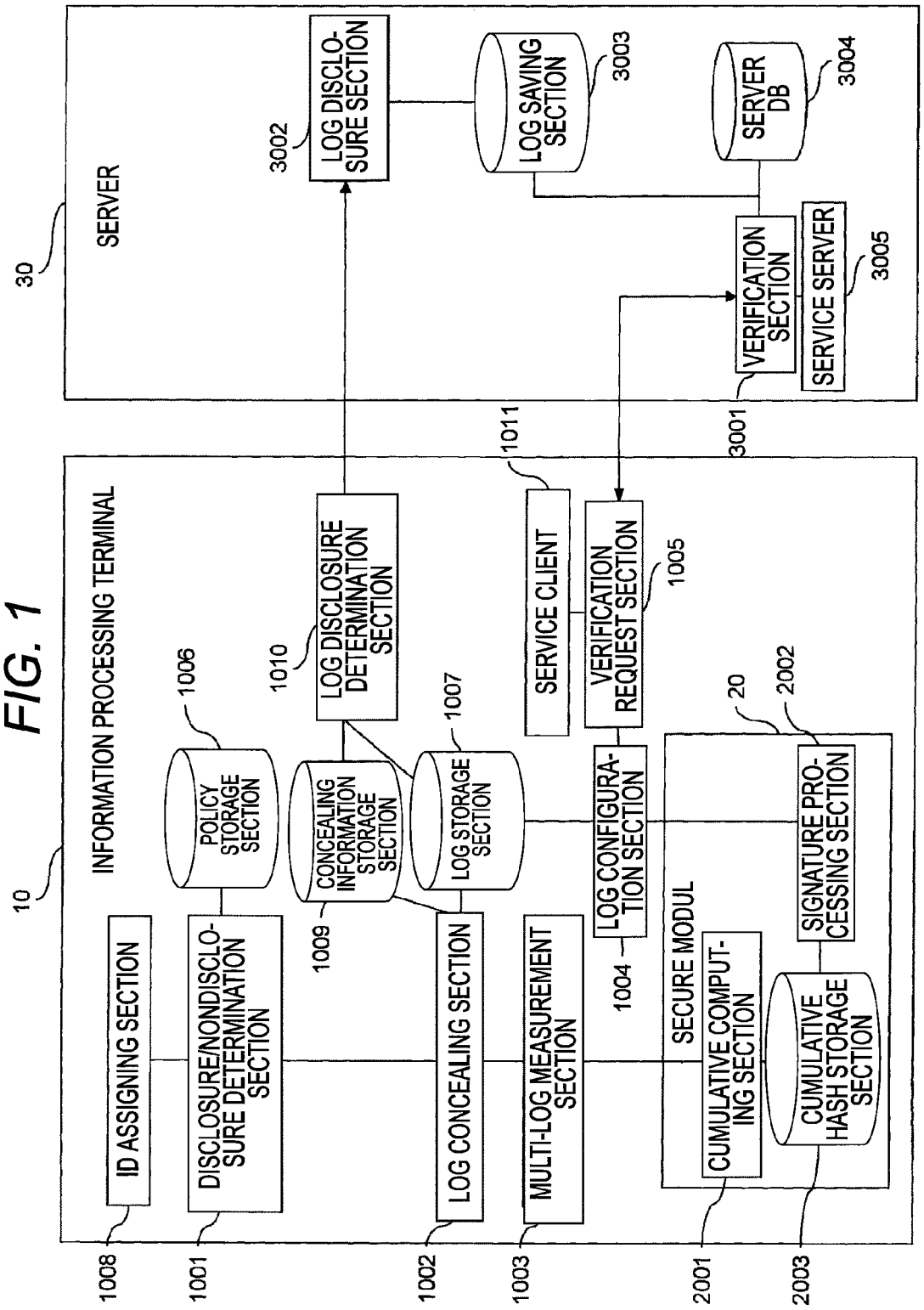
FIG. 1 is a block diagram of a first embodiment of the present invention.

FIG. 1 is a block diagram of a first embodiment of the present invention. The configuration of the embodiment will be described by reference to FIG. 1. An information processing terminal 10 has a disclosure/nondisclosure determination section 1001 that determines a server to which an entry can be disclosed; a log concealing section 1002 that conceals an entry from an nondisclosure server; a multi-log measurement section 1003 that receives an entry not to be concealed and an entry to be concealed and that commands updating of a plurality of cumulative hashes in accordance with a result of determination made by the disclosure/nondisclosure determination section 1001; a log configuration section 1004 that configures a log conforming to a notification server; a verification request section 1005 that notifies a server of a signed log, to thus demand verification; policy storage section 1006 that stores policy data; log storage section 1007 that stores an entry; an ID assigning section 1008 that assigns an entry ID to an entry; concealing information storage section 1009 that stores concealing information about the nature of concealment; a log disclosure determination section 1010 that determines whether to disclose an entry corresponding to an input entry ID; and a service client 1011 that receives a service from a server.

A secure module 20 has a cumulative computing section 2001 that receives a hash and a cumulative hash number and that updates a corresponding cumulative hash; a signature processing section 2002 that computes a digital signature by a cumulative hash; and cumulative hash storage section 2003 that stores a cumulative hash. The secure module 20 desirably has tamper resistance.

A server 30 has a verification section 3001 that verifies a signed log; a log disclosure section 3002 that receives concealing information, to thus cancel concealment of an entry; log saving section 3003 that saves a log; a server DB 3004 that records data for verifying a log; and a service server 3005 that offers a service.

The information processing terminal 10 is; for instance, a personal computer or a portable cellular phone. The disclosure/nondisclosure determination section 1001, the log concealing section 1002, the multi-log measurement section 1003, the log configuration section 1004, the verification request section 1005, the ID assigning section 1008, the log disclosure determination section 1010, and the service client 1011 are implemented as software to be executed by a CPU provided in the information processing terminal 10. The policy storage section 1006, the log storage section 1007, and the concealing information storage section 1009 are built of a storage device, such as an HDD or semiconductor memory.

The secure module 20 is a chip having tamper resistance like; for instance TPM. The cumulative computing section 2001 and the signature processing section 2002 are implemented by means of a processor provided in the secure module 20, and the cumulative hash storage section 2003 is implemented by a storage device provided in the secure module 20.

A server 30 is; for instance, a high-performance personal computer. The verification section 3001, a log disclosure section 3002, a service server 3005, and the like are implemented as software to be executed by a CPU provided in the server 30. Further, log saving section 3003 and a server DB 3004 are built of a storage device, such as a HDD and semiconductor memory.

Figure 5:
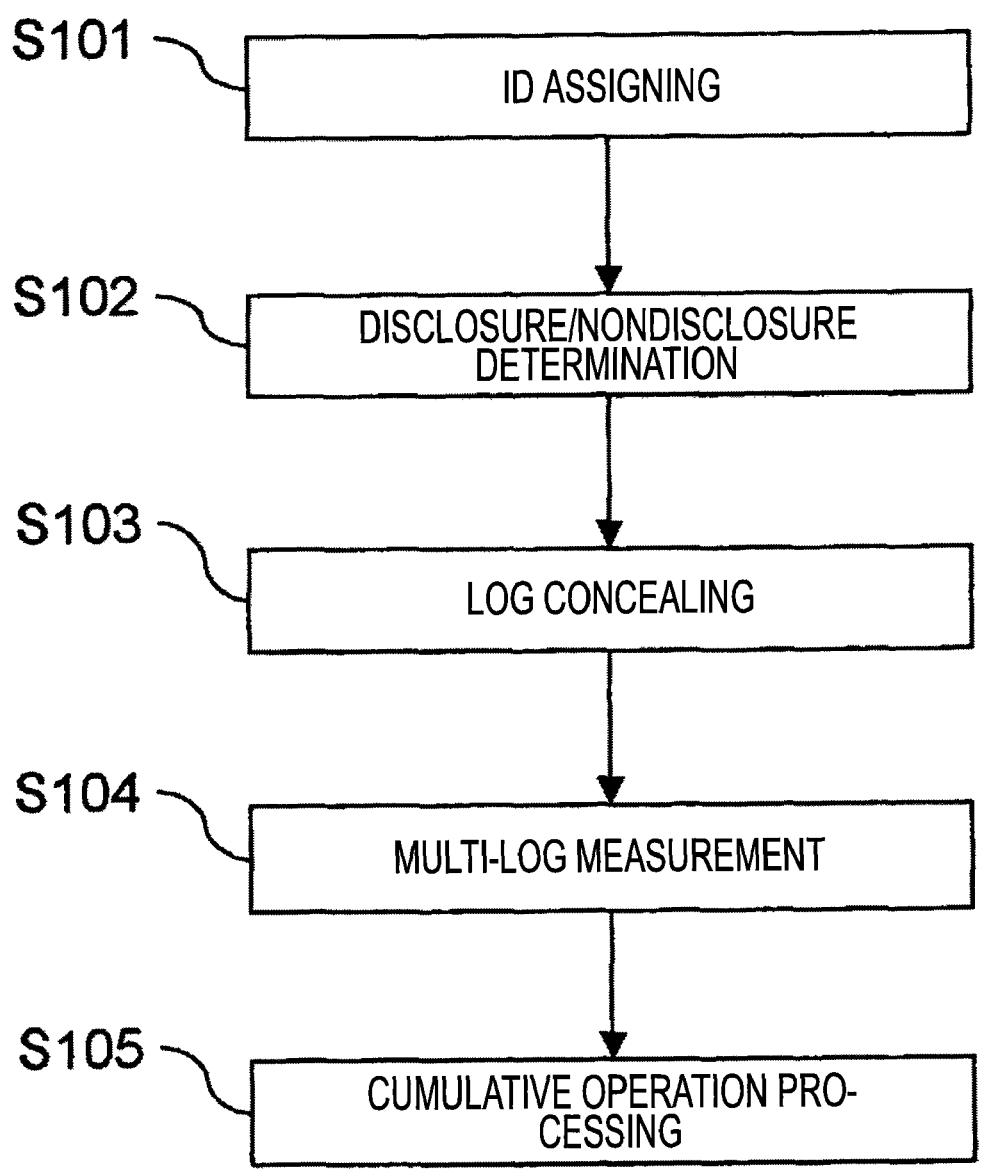
FIG. 5 is a descriptive view of cumulating operation of the first embodiment of the present invention.

Measurement operation for accumulating hashes at the time of occurrence of an event will now be described by reference to FIG. 5. An entry of event information generated by the information processing terminal 10 is passed to the ID assigning section 1008. The ID assigning section 1008 provides an entry with an entry ID that can uniquely specify the entry (an ID assigning step S101).

The disclosure/nondisclosure determination section 1001 determines, by use of policy data stored in the policy storage section 1006, a server to which an entry can be disclosed (a disclosure/nondisclosure determination step S102). In this case, a provider of software for the entry, a system manager of an information system including the information processing terminal 10, or a user of the information processing terminal 10 can set a person to whom the policy data can be disclosed.

The log concealing section 1002 stores an entry in the log storage section 1007 and conceals an entry from a server to which an entry is not to be disclosed (a log concealing step S103). At this time, the log concealing section 1002 stores, in the concealing information storage section 1009, concealing information representing how the entry is concealed.

Concealment processing is; for instance, encryption of a randomly-generated key. In such a case, an encryption key is stored as concealing information in correspondence with an entry ID. Alternatively, an encryption key, which is unique to a device, called a master key, may be kept in secret, and a key to be used for concealment may also be generated from data whose entry ID is encrypted with the master key. Alternatively, the entry may also be completely deleted, or only fragmentary information about the entry may also be left. In such a case, when disclosure of the entry is made possible later, the entry itself is stored as concealing information.

The multi-log measurement section 1003 receives both an entry not to be concealed and an entry to be concealed and commands the secure module 20 to update a plurality of cumulative hashes in accordance with a result of determination made by the disclosure/nondisclosure determination section 1001 (a multi-log measurement step S104). More specifically, a cumulative hash number and a hash of an entry are passed to the secure module 20, to thus command the secure module 20 to perform processing for accumulating the hash of the entry, which is concealed as required, into a cumulative hash corresponding to each of the servers.

The cumulative computing section 2001 of the secure module 20 receives the hash and the cumulative hash number, thereby updating a corresponding cumulative hash. The cumulative hash is stored in the cumulative hash storage section 2003 (a cumulative operation processing step S105).

Operation by means of which a service client notifies a service server of a status will now be described by reference to FIGS. 6A and 6B. In order to receive a service from the service server, the service client sends, by means of the operation, a notification so as to enable the service server to ascertain that the current status of the information processing terminal is desirable. First, the service client 1011 demands verification from the verification request section 1005 (a verification request step S111).

The verification request section 1005 demands a signed log from the log configuration section 1004 (a signed log request step S112). The log configuration section 1004 extracts a corresponding entry from the log storage section 1007; executes concealment processing to the entry as required, to thus constitute a log conforming to a notification server; and designates a cumulative hash number corresponding to the notification server, thereby demanding a signature from the signature processing section 2002 (a signature request step S113).

The signature processing section 2002 computes a digital signature corresponding to a cumulative hash assigned the designated cumulative hash number (a signature processing step S114). Computation of the digital signature is typical computation for processing a cumulative hash by means of a signature key of the secure module 20 and performed by means of a well-known technique, such as RSA. Hashes belonging to the same data sequence assume the same value, and results of digital signing also become identical with each other depending on an algorithm. For these reasons, it is desirable to take countermeasures against retransmission attack by use of a random number received from a server or by causing an entry to include a time stamp.

The digital signature is a digital signature for cumulative hash corresponding to a re-configured log. The verification request section 1005 which has received the digital signature from the signature processing section 2002 generates a signed log and sends the singed log to the verification section 3001 (a signed log transmission step S115).

The verification section 3001 receives the signed log; first verifies a certificate; and then verifies a signature affixed to a cumulative hash by use of a public key contained in the certificate, to thus ascertain that the cumulative hash is not tampered; computes the cumulative hash from a log of the received entry; and checks the computed cumulative hash against the received cumulative hash, thereby verifying that no inconsistency exists between the received cumulative hash and the log of the entry.

Further, data to be used for verifying a log are extracted from the server DB 3004, and the log is verified (a log verification step S116). The verification section 3001 saves the received signed log into the log saving section 3003.

Upon receipt of confirmation that the operating status of the service client 1011 proves no problem, the service server 3005 offers a service (a service provision step S117). Desirably, a session key is shared between the service client 1011 and the service server 3005 during the course of a series of communication for notification and verification and used for communication at the time of provision of a service.

Figure 7:
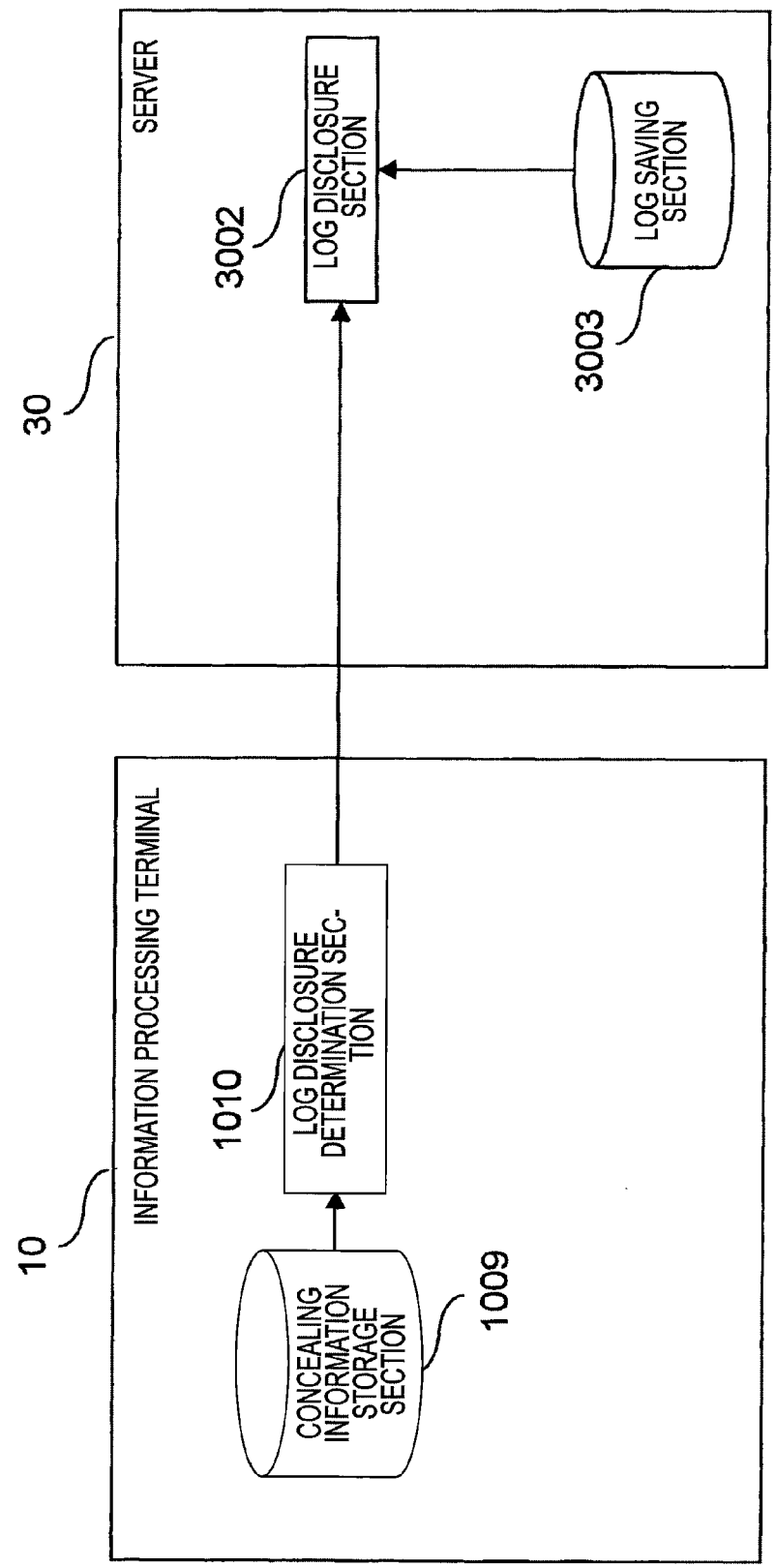
FIG. 7 is a descriptive view of disclosure operation of the first embodiment of the present invention.

Operation for disclosing a concealed entry when the information processing terminal 10 sends a notification to the server 30 will now be described by reference to FIG. 7 and FIG. 6C.

The log disclosure determination section 1010 of the information processing terminal 10 determines whether to disclose the entry specified by the entry ID (a log disclosure determination step S121). When it is determined that the entry can be disclosed, concealing information about the entry is extracted from the concealing information storage section 1009, and the thus-extracted concealing information is transmitted to a destination where the entry is to be disclosed (a concealing information transmission step S122).

A person for requesting disclosure of a log is; for instance, a user who found a malfunction or a server manager who suspects fraud; and specifies an entry, for which disclosure will be requested, by means of an entry ID. The log disclosure determination section 1010 automatically determines disclosure according to a given rule (e.g., a rule in which the entry is disclosed in response to a request only from an authenticated user or server). Since there may be cases where information to be disclosed includes privacy information, a command input by the user may also be included as an element for the determination of disclosure made by the log disclosure determination section 1010. In this case, the user makes a determination in consideration of contents of an entry and a necessity for disclosure and inputs a command to the information processing terminal. In response to a request for disclosure of an entry, a concealed entry rather than an entry ID may also be input to the log disclosure determination section 1010. Moreover, an entry released from a concealed state may also be transmitted to a destination, where an entry is to be disclosed, in place of concealing information.

The log disclosure section 3002 of the server 30 receives concealing information, extracts a concealed entry from the log saving section 3003, and releases the entry from a concealed state (a concealment release step S123).

Specific example data will now be described by reference to FIGS. 8A to 8D. FIG. 8A shows specific example data pertaining to an entry. The first row shows an entry ID. The second row shows a time stamp representing a time at which an event has arisen. The third row shows the type of an event, wherein loading of a component is described here. Another possible type of an event other than loading is; for instance, unloading. The fourth row shows a name that enables designation of an involved component. The fifth row shows a hash of a component. The sixth row shows a version. Some of the rows become unnecessary depending on the type of an event.

FIG. 8C shows specific example data pertaining to a policy. The first row shows the name of a service. The second row shows a list of names of components provided by means of a service. The third row shows the designation of a server that offers service. In addition, a name of a server (or a service) that is allowed to be notified may also be included in the policy.

General descriptions about specific examples of data will first be provided. When power is turned on, the information processing terminal sequentially executes processing in sequence of a BIOS, a Loader, and a Kernel and measures resultant events. Subsequently, measurement and execution of applications are run by means of the function of the Kernel.

A service to which the occurred event belongs is determined; a determination is further made as to which server is eligible for notification; and measurement is performed. An unconcealed entry is accumulated to a cumulative hash corresponding to a server eligible for notification, whilst a partially-encrypted entry is accumulated to a cumulative hash corresponding to a server ineligible for notification.

In case of necessity, such as the case where an application makes a connection with a server, a log to be notified to the server is built from the entry, and a corresponding cumulative hash is signed and sent to a server. The server verifies whether or not the received log is tampered, and then verifies the log after having confirmed that the log is not tampered. After it has been ascertained, from contents of the log, whether or not a required, authorized component is running, a service is offered.

If a failure has arisen because of presence of a component of another service after initiation of provision of the service, details of an entry of the component are disclosed to allow a server manager to perform a check.

Figure 9:
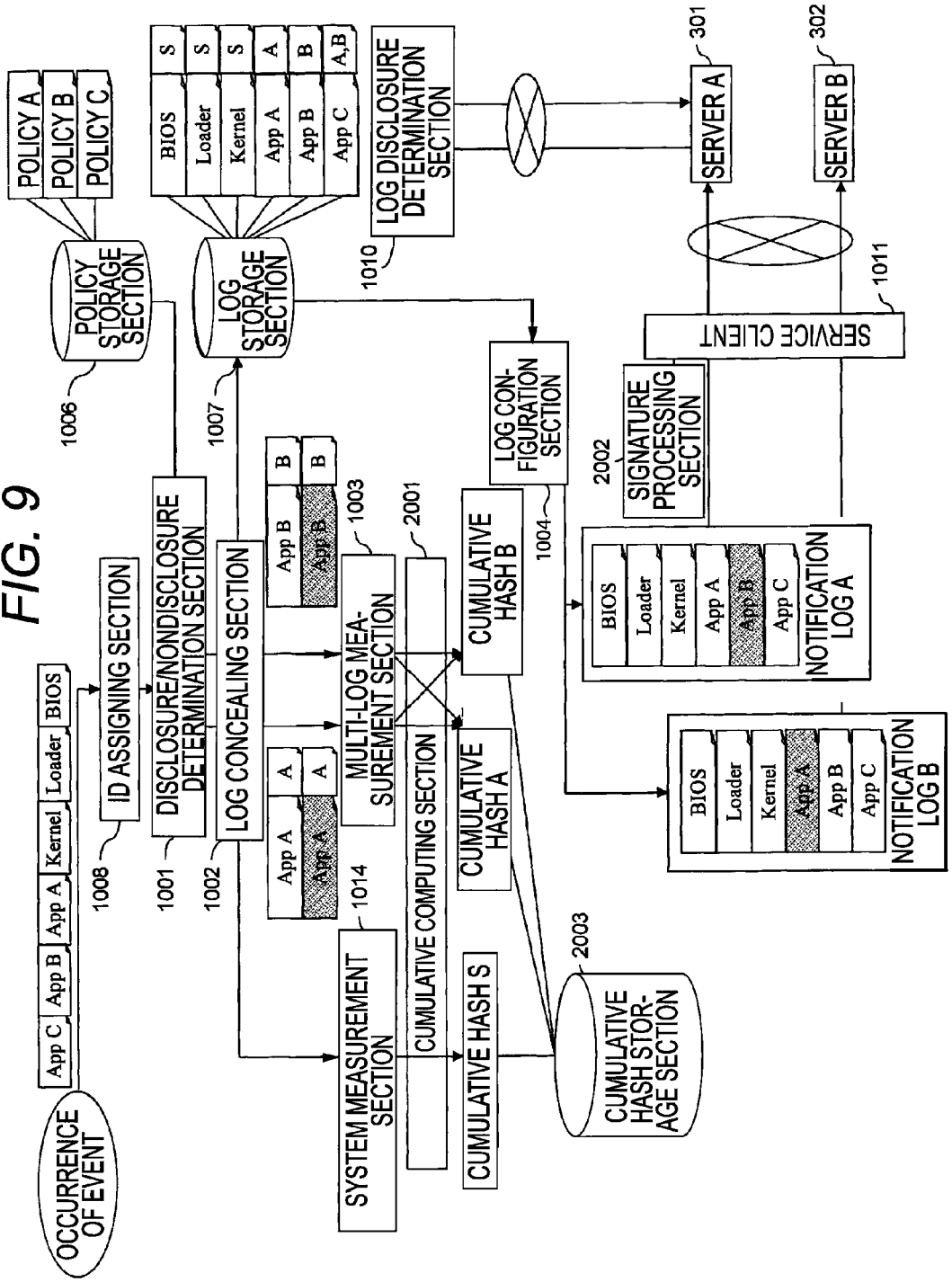
FIG. 9 is a descriptive view of specific example data of the first embodiment of the present invention.

A specific example of the first embodiment will now be described by reference to FIG. 9. In the specific example, all logs concerning a system are transmitted at all times without change according to each server and, therefore, measured separately in view of efficiency. For this reason, a system measurement section is separately provided, but the configuration is not indispensable.

First, when a component is executed, an event arises, whereupon an entry is generated. A time stamp, a type, a name, a hash, and a version, all of which are described previously, are described in the entry. In the present example, processing is performed in sequence of a BIOS, a Loader, a Kernel, App A, App B, and App C. Each of the BIOS, the Loader, the Kernel, the App A, the App B, and the App C may also include a plurality of components. In such a case, an entry is generated as a result of execution of each of the components. The App A is client software for a service A. Likewise, the App B is client software for a service B, and the App C is client software for a service C. In the strict sense, the following descriptions apply to measurement operation subsequent to the kernel. However, similar processing is assumed to have been performed in regard to the BIOS, the Loader, and the Kernel, as well.

The ID assigning section 1008 sequentially assigns a numeral to the generated entry. The numeral starts from one and monotonously increases. The values are not reset and retained even when power is shut off.

The disclosure/nondisclosure determination section 1001 receives the entry to which the entry ID is assigned and determines which server is eligible for notification by utilization of a policy stored in the policy storage section 1006. A service to which the component belongs and a server corresponding to the service are specified, and provision of a notification to the server is determined to be possible.

In addition, providing of a notification to relevant servers may also be admitted. In this case, a description to the effect is provided in the policy. In this example, the BIOS, the Loader, and the Kernel are determined to correspond to entries of the system; it is determined that the App A can be notified to a server A; it is determined that the App B can be notified to a server B; and it is determined that the App C can be notified to the server A and the server B.

Specific descriptions are provided by use of the entry exemplified in FIG. 8A, the policy A exemplified in FIG. 8C, and the policy B exemplified in FIG. 8D.

The disclosure/nondisclosure determination section 1001 acquires a name drm-b.dll from the entry and searches for the name in "ServiceFiles" field of the policy. Although not included in the policy A (FIG. 8C), the name is included in the policy B (FIG. 8D). Hence, the entry is understood to correspond to the App B. Contents in "Server" field of the policy B represent the name of a notifiable server. In the present embodiment, the name is drm.example.org. Thus, it is determined that the entry can be notified to drm.example.org (which is assumed to be the server B) and cannot be notified to other servers.

In order to search for a service by name at high speed, it is desirable to adopt the way to efficiently hold data in such a way that a service is retrieved by name, such as use of a database.

In the case of an entry belonging to the system, the log concealing section 1002 passes the entry as-is to the system measurement section 1014. In other cases, an entry is subjected to concealing operation, and the original entry and the concealed entry are passed to the multi-log measurement section 1003. In the drawing, diagonal lines on the entry show that the entry is subjected to concealing operation.

Example concealing operation is described. An entry ID and a time stamp are left without being concealed. First, a hash of a plain part to be concealed is computed, and the computed hash is inserted into the third row. Next, a key for use in encryption is generated from the data generated by encrypting an entry ID with a master key. Finally, the fourth rows and subsequent rows of the entry are encrypted, thereby performing concealing operation. FIG. 8B shows an example concealed entry. Under the method, nothing is particularly saved as concealing information. The reason for this is that a key for decryption can be generated by receiving the first row from the server. When a key to be used for encryption is randomly generated, the key is stored in correspondence with the entry ID.

The original entry and a list of servers that a notification can be sent is stored in the log storage section 1007. The speed of processing performed at the time of notification is increased, if the concealed entries are also stored. However, since redundant storage is required, it makes a choice whether or not to store them according to the capacity of the log storage section 1007.

The system measurement section 1014 computes a hash of an entry and transmits the thus-computed hash to a cumulative computing section 2001 along with a cumulative hash number corresponding to the system. The cumulative computing section 2001 accumulates a cumulative hash S that is a cumulative hash corresponding to the system.

The multi-log measurement section 1003 receives the original entry and the concealed entry and transmits, to the cumulative computing sections 2001 in all of the servers, the hash of the entry processed for the respective servers along with the cumulative hash numbers corresponding to the respective servers. A number of a cumulative hash that is not yet used at the time of first accumulation of an entry is assigned as a cumulative hash number, and the number is stored in correspondence with a server so as to be used later.

The cumulative computing section 2001 accumulates hashes of entries into cumulative hashes corresponding to respective servers; for instance, a hash of an entry assigned to the server A into a cumulative hash A, a hash of an entry assigned to the server B into a cumulative hash B. In the case of a specific example shown in FIG. 9, a hash of an entry is accumulated as-is into the cumulative hash A in relation to an entry relevant to the App A, and a hash of a concealed entry is accumulated into the cumulative hash A in relation to an entry relevant to the App B. Conversely, a hash of a concealed entry is accumulated into the cumulative hash B in relation to an entry relevant to the App A, and a hash of an entry is accumulated as-is into the cumulative hash B in relation to an entry relevant to the App B.

At the time of accumulation, a cumulative hash assigned to a server of a service corresponding to an application that is not yet started is also subjected to accumulation. It can be assumed that most of services allow notification of their entries solely to their own servers. Entries of another service are accumulated in a cumulative hash assigned to a server of a service corresponding to an unstarted application, and hence concealed entries are accumulated in many cases. In this case, values of cumulative hashes assigned to servers of services corresponding to a plurality of applications that are not yet started become equal to each other. By utilization of such a characteristic, accumulation is performed as if they were a single cumulative hash, so long as values of cumulative hashes are equal to each other. When a difference arises among values of the cumulative hashes, the cumulative hashes are copied. Subsequently, the cumulative hashes are individually subjected to accumulation, whereby the amount of operation required for accumulation can be diminished.

In the above, the flow of accumulation is described. Notification will now be described. A service client that receives a service passes a name of a server to be notified to a log configuration section for notification purpose and requires a signed log.

The log configuration section 1004 extracts entries from the log storage section 1007 and concatenates the thus-extracted entries, to thus constitute a log. At this time, when the name of the server is included in the list of notifiable servers, entries are concatenated as they are. When the name is not included, concealed entries are concatenated with each other. When entries concealed at the time of accumulation are stored, the concealed entries are used. Further, the signature processing section 2002 is requested to affix a signature to a cumulative hash corresponding to the log of the system and a cumulative hash corresponding to a service.

The signature processing section 2002 affixes a signature to a specified cumulative hash. The log configuration section 1004 returns the log and the signature to the verification request section 1005, and the verification request section 1005 further concatenates a certificate with them, thereby generating a signed log, and notifies the server of the signed log. For instance, the server A301 receives a signed log A including data pertaining to the signed cumulative hash S and the signed cumulative hash A, a log having a concealed entry of the App B, and a certificate. The server B302 receives a signed log B including data pertaining to the signed cumulative hash S and the signed cumulative hash B, a log having a concealed entry of the App A, and a certificate.

In each of the servers, the log is stored in the log saving section 3003. Each of the servers first verifies the certificate; further verifies a signature affixed to the cumulative hash by use of a public key included in the certificate, thereby ascertaining that the log is not tampered; computes a cumulative hash from the log of the received entry; and checks the computed hash against the received cumulative hash, to thus verify that no inconsistency exists between the received cumulative hash and the log of the entry. Even in relation to a concealed entry, a hash is computed in same manner as in the case of an unconcealed entry, thereby computing a cumulative hash. Each of the servers can ascertain entries that are necessary and sufficient for offering a service and further can check whether or not the status of the information processing terminal poses any problem when the system offers a service, by use of information about the server DB.

For instance, it is possible to make sure that a component of the App A is not illegally tampered; that an unauthorized component is not running; and that conversely a required another component (e.g., drm-b.dll or the like) is running. The user of the terminal does not need to disclose an entry that is not required thus far, so that privacy is protected.

The above is the flow of notification. Disclosure will now be described. The user of the server A is assumed to have realized that a service client for a service does not operate normally and cannot offer a service and have provided the server A with a notification to the effect. When a manager of the server A receives the notification and considers a necessity for making sure contents of a concealed entry (an entry of the App B) in order to analyze the failure, the manager sends an entry ID of the concealed entry to the log disclosure determination section 1010, thereby requesting the disclosure of the entry.

The log disclosure determination section 1010 determines whether to disclose an entry corresponding to the entry ID. In the present embodiment, an entry ID is extracted from the concealed entry, and an encryption key is generated from the data generated by encrypting the entry ID with using a maser key; the entry is released from a concealed state, to thus submit the contents of the entry to the user, whereby the user determines whether or not to disclose the entry.

When the user ascertains contents of the entry pertaining to the App B, determines the entry as being susceptible of disclosure, and inputs a command to the effect, the information processing terminal 10 transmits the unconcealed entry to the server A. The server A computes a hash of plain part corresponding to a concealed portion and compares the thus-computed hash with a corresponding hash value included in the concealed entry (corresponding to a hash value of the third row in the example shown in FIG. 8B), thereby ascertaining that the contents of the entry are correct.

The above is the flow of disclosure. When contents of the entry that were concealed at the time of notification must be disclosed later, the contents can be disclosed.

As described above, in the present embodiment, the cumulative hash of an entry is held for each of the servers, and a digitally-signed cumulative hash and a log of a reconfigured entry are transmitted to the server. The server performs verification of a digital signature and verifies consistency between the cumulative hash and the log of the entry. The server first verifies that the received cumulative hash is the cumulative hash stored in the information processing terminal, by means of verifying the digital signature affixed to the cumulative hash; computes a cumulative hash from a log of the received entry; and checks the computed cumulative hash against the received cumulative hash, thereby verifying that no inconsistency exists between the received cumulative hash and the log of the entry. Thereby, both security and privacy information can be protected.

In the present embodiment, for the sake of brevity of explanation, the respective servers are described as servers that offer a service in an application layer, such as the App A and the App B. However, the respective servers may also offer services of pieces of software of different layers, such as a BIOS, a Kernel, and an application. When the information processing terminal is a cellular phone, the respective servers may also be a server of a manufacturer who provides portable cellular phones as devices and a server of an operator that provides a network service. Even in such a case, a cumulative hash of an entry is held for each of the servers.

In the present embodiment, the ID assigning section 1008 assigns to an entry, an entry ID for uniquely specifying the entry; however, the same ID may also be assigned to entries having the same contents.

In the present embodiment, the disclosure/nondisclosure determination section 1001 determines only a server that can be disclosed and makes a determination as to the presence/absence of concealment on a per-server basis; however, may also make a determination so as to perform different concealment processing from one server to another. Although the server ascertains respective components in the present embodiment, the information processing terminal 10 may perform verification by means of; for instance, a certificate and cause an entry to include a result of verification.

In the present embodiment, all entries belonging to the system are disclosed, but contents to be notified may also be changed for each server. For instance, the user may also provide a policy and impose a limitation on entries of the system. For example, an entry pertaining to a device driver that does not need to be notified is not notified, whereby the sort of the device used can still remain unknown.

Second Embodiment

A second embodiment of the present invention describes a case where a service client is running on a virtual execution environment. Since virtualization software separates a virtual execution environment from an execution environment realized by a Kernel, the environments do not affect each other, and it is not necessary to notify a component that runs in a different execution environment. To this end, the virtualization software and a component employed until execution of the virtualization software must be verifiable.

Figure 2:
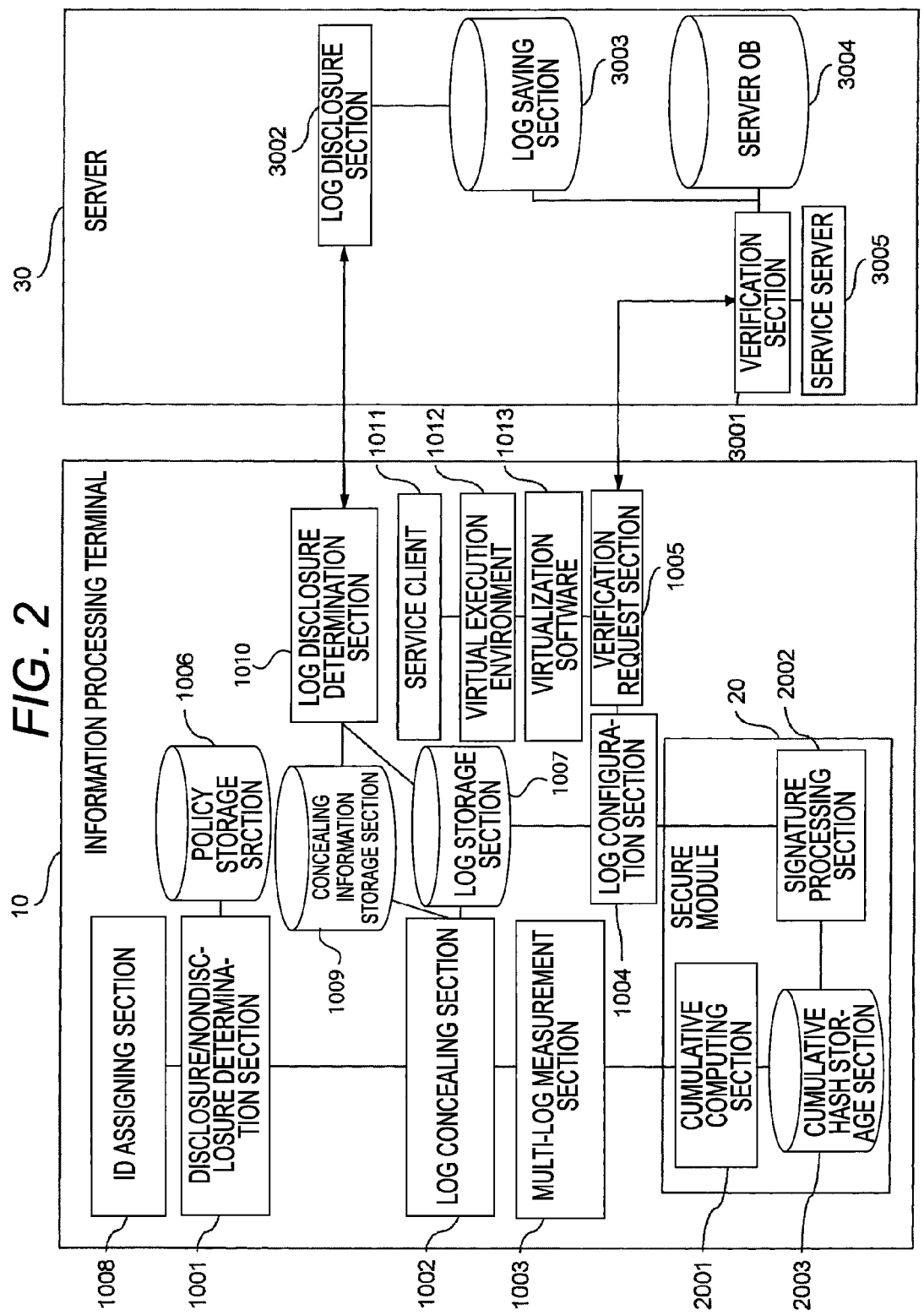
FIG. 2 is a block diagram of a second embodiment of the present invention.

FIG. 2 is a block diagram of a second embodiment of the present invention. A configuration will be described by reference to FIG. 2. In addition to including the elements of the information processing terminal described in connection with the first embodiment, the information processing terminal 10 has a virtual execution environment 1012 realized by a Kernel differing from the Kernel that has initially started and virtualization software 1013 that enables execution of the virtual execution environment 1012.

Operation of the terminal will now be described. After a Kernel has started as a result of power-on of the information processing terminal 10, the virtualization software 1013 is measured and started. The virtualization software 1013 prepares and executes the virtual execution environment 1012. The virtual execution environment 1012 is separated from the original execution environment by means of the virtualization software 1013, and the virtual execution environment and an application running in the environment do not directly affect the original execution environment.

The service client 1011 is executed in the virtual execution environment 1012. Although the service client 1011 is also measured at this time, a hash differing from a cumulative hash used for measurement by the original execution environment is used for accumulation. When a plurality of the service clients 1011 are executed, a plurality of accumulations are performed as in the first embodiment. In this case, a hash differing from the cumulative hash used in the original execution environment is used for accumulation.

The service client running in the original execution environment provides the server with a notification by use of the cumulative hash of the original execution environment, and the service client running in the virtual execution environment provides the server with a notification by use of a cumulative hash of the virtual execution environment, so that further enhancement of privacy can be attained.

Although a lot of resources are used, further enhancement of privacy can be attained by means of preparing a plurality of execution environments and reducing the number of service clients assigned to one execution environment. Pursuit of a reduction in the number of service clients also enables assignment of one execution environment to one service client. In this case, in the case of occurrence of a failure, it can be specified that a cause of the failure is some one of the service client, the execution environment of the service client, the virtualization software, and a lower-level component.

A specific example will be described by reference to FIG. 12. After start of the information processing terminal, pieces of software are launched in sequence of a BIOS, a Loader, a Kernel, a VL (an abbreviation of a Virtualization Layer which corresponds to virtualization software), a Kernel' (corresponding to a virtual execution environment), the App A and the App B that are started in the original execution environment, and the App C and the App D that are executed in the virtual execution environment. FIG. 13A shows a view of a software stack achieved in this state.

It is assumed that respective services allow notification of their entries solely to their servers. The BIOS, the Loader, the Kernel, the VL, and the Kernel' are assumed to be entries of the system to be disclosed.

In order to guarantee the correctness of a status of the virtual execution environment, the correctness of the original execution environment must also be guaranteed, and hence entries for the original execution environment are taken over to the virtual execution environment. The entries are taken over to a virtual execution environment by way of virtualization software. The thus-taken-over entries and entries of the Kernel' that serves as the virtual execution environment are accumulated, whereupon a cumulative hash S' serving as a virtual execution environment is formed.

The BIOS, the Loader, the Kernel, the VL, the App A, and the App B are accumulated as in the first embodiment. After starting of the VL, the Kernel' is started, and the App C and the App D are subsequently launched. Entries generated in the virtual execution environment after launching of the Kernel' are accumulated in a cumulative hash independent of the original execution environment.

Figure 12:
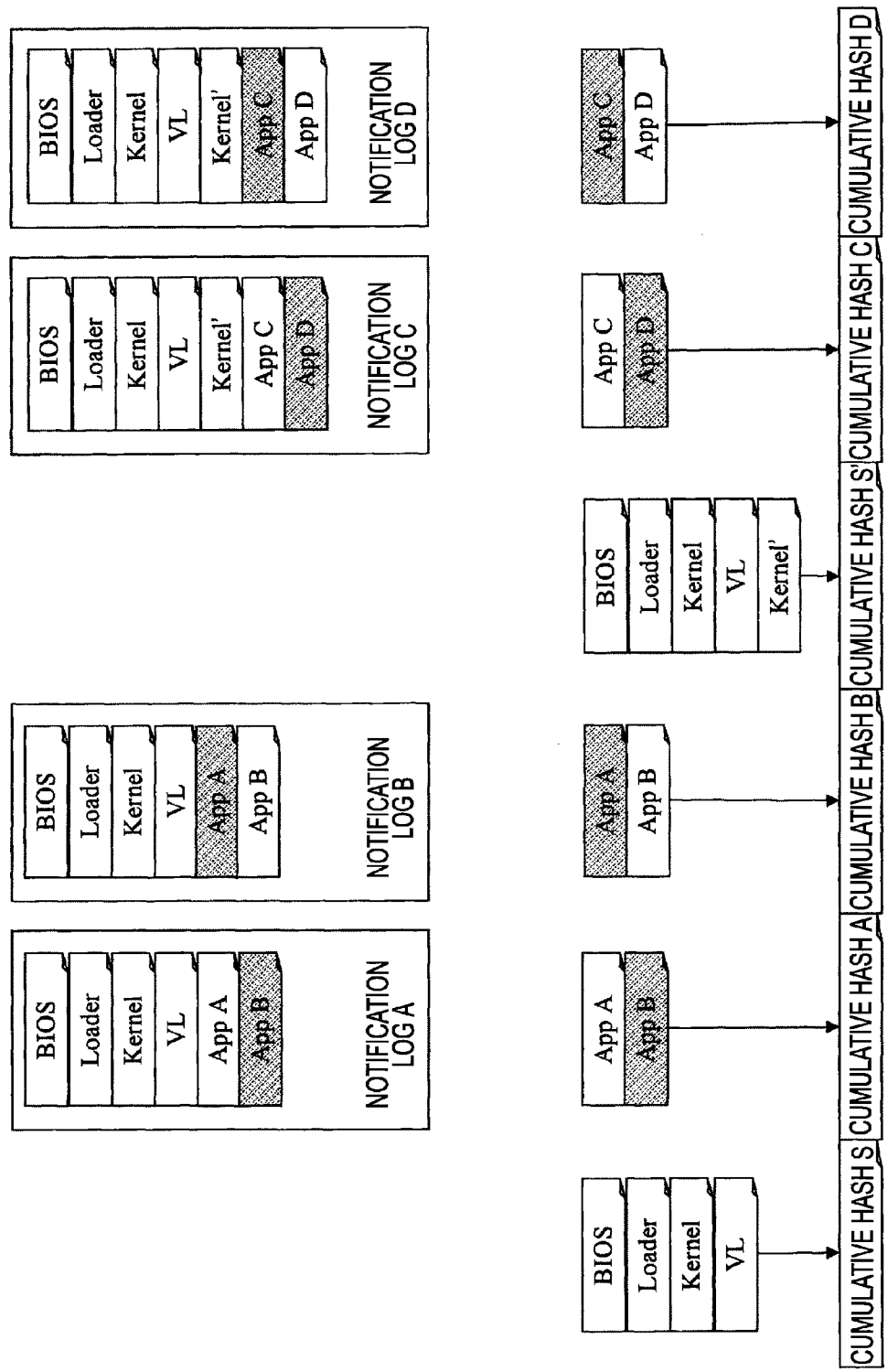
FIG. 12 is a descriptive view of a specific example of the third embodiment of the present invention.
Figure 13A:
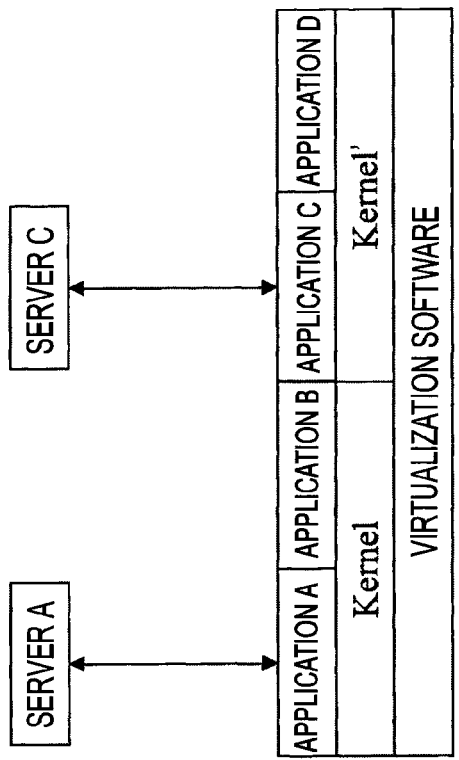
FIGS. 13A and 13B are views of a software stack of the second embodiment of the present invention.

Arrows in FIG. 12 represent which entries are accumulated into each cumulative hash. For instance, an entry of the App A is accumulated as-is in the cumulative hash A, and an entry of the App B is accumulated in a concealed manner in the cumulative hash A. An entry of the App C and an entry of the App D are not accumulated. Likewise, the entry of the App C is accumulated as-is in the cumulative hash C, and the entry of the App D is accumulated in a concealed manner in the cumulative hash C. The entry of the App A and the entry of the App B are not accumulated.

Log generated from the entries regarding to an execution environment where the service client operates and applications running in the execution environment are notified to the respective servers. For instance, a signed log A including a signed cumulative hash S and a signed cumulative hash A is notified to the server A, and a signed log C including a signed cumulative hash S' and a signed cumulative hash C is notified to the server C.

Thus, the VL assures that the execution environments do not affect each other. Since the components running in different execution environments do not cause a failure or fraud, entries of the components do not need to be notified.

Figure 13B:
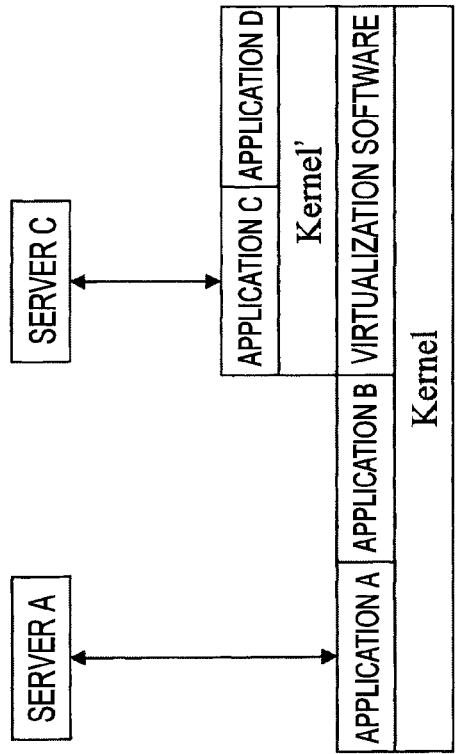
Figure 14:
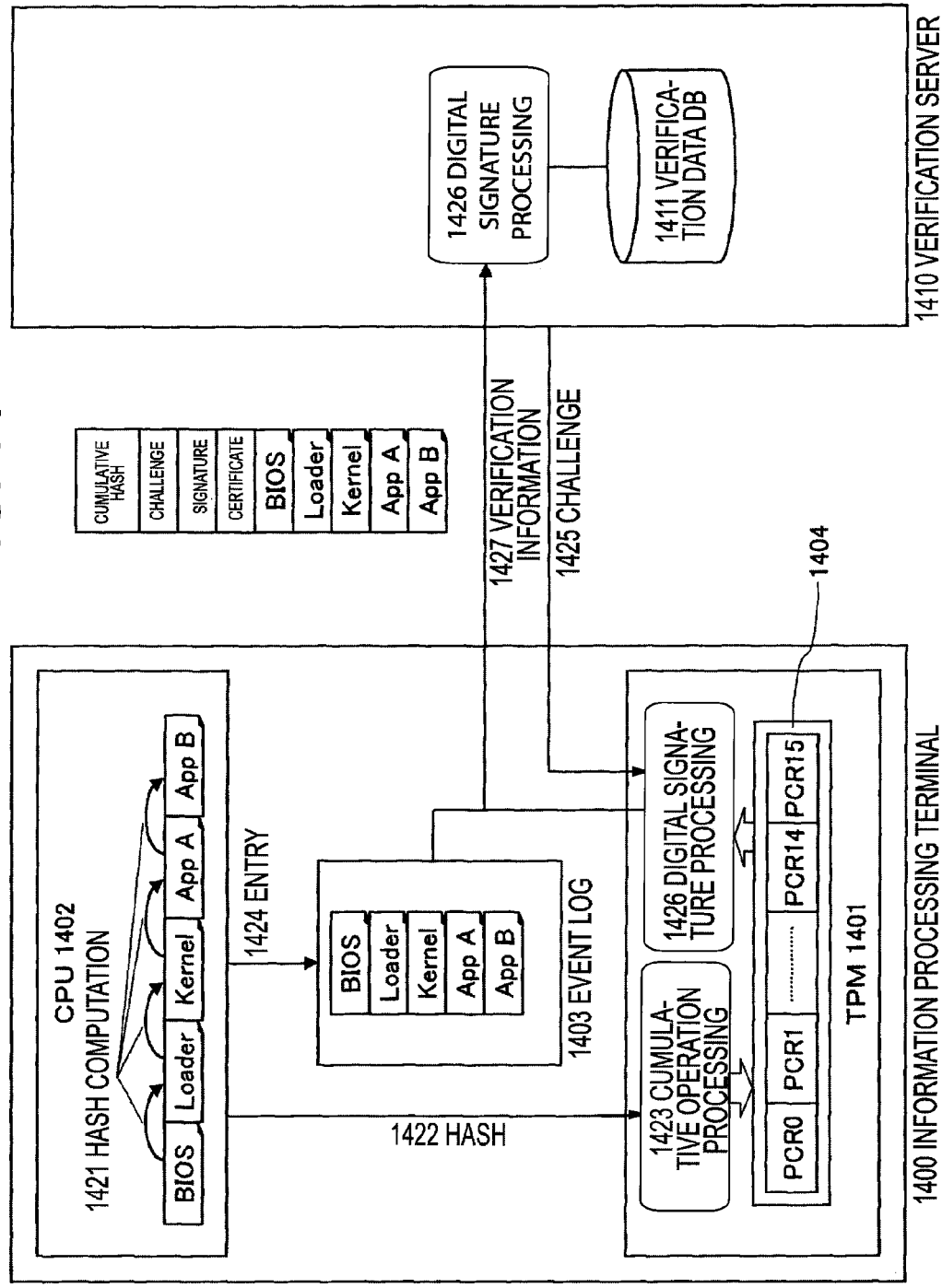
FIG. 14 is a descriptive view of a system that verifies software running on an information processing terminal based on the known art.

In the present embodiment, the virtualization software 1013 is executed after start of the Kernel. However, as shown in FIG. 13B, a program to be first started may also the virtualization software 1013, and the Kernel and the other Kernel' may also be started on the software.

Third Embodiment

Figure 3:
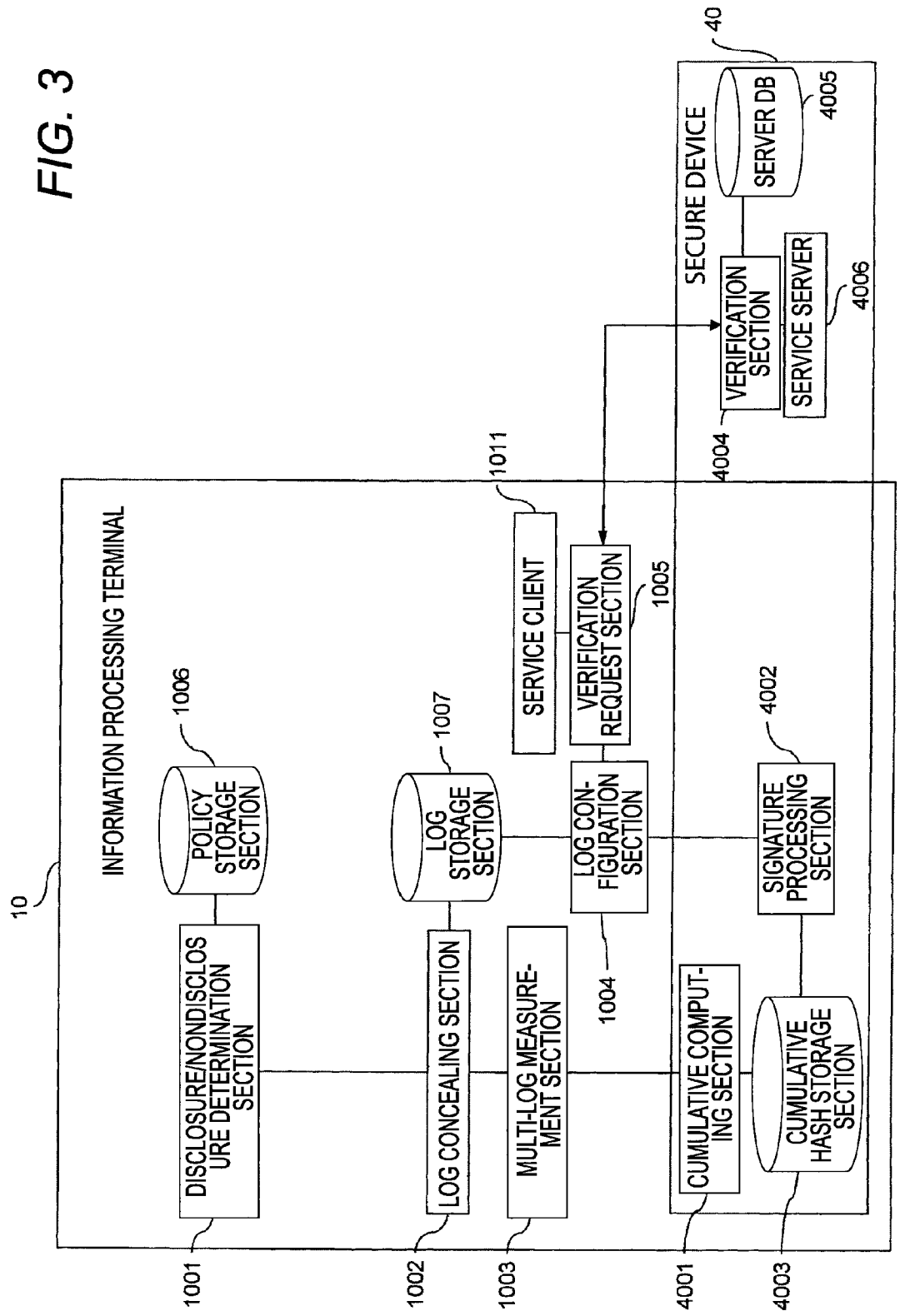
FIG. 3 is a block diagram of a third embodiment of the present invention.

In a third embodiment of the present invention, an information processing terminal having a removable secure device equipped with a tamper resistant storage area and a processor will be described. FIG. 3 is a block diagram of the third embodiment of the present invention.

A configuration of the terminal will be described by reference to FIG. 3. Processing contents of the respective constituent blocks are the same as those described in the first embodiment. The information processing terminal 10 has the disclosure/nondisclosure determination section 1001; the log concealing section 1002; the multi-log measurement section 1003; the log configuration section 1004; the verification request section 1005; the policy storage section 1006; the log storage section 1007; and the service client 1011.

A secure device 40 has a cumulative computing section 4001; a signature processing section 4002; cumulative hash storage section 4003; a verification section 4004; a server DB 4005; and a service server 4006.

Figure 10:
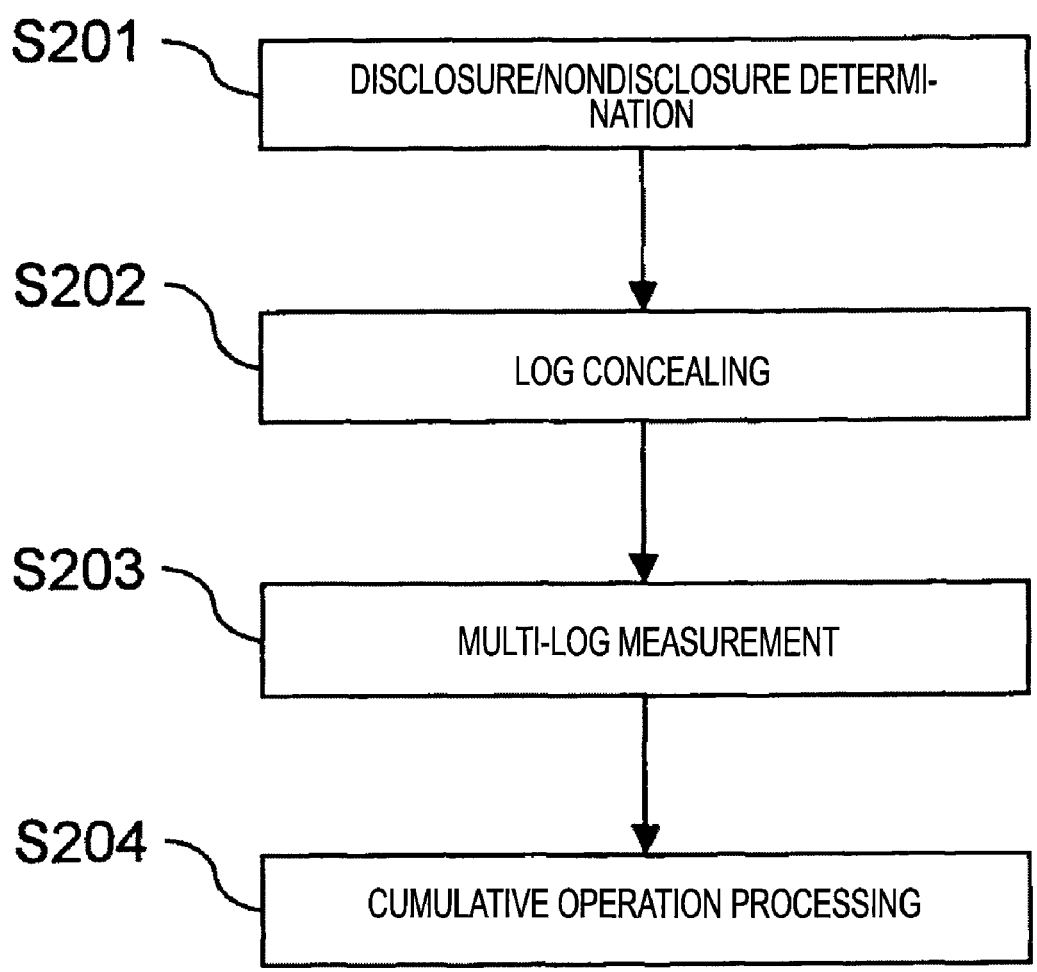
FIG. 10 is a descriptive view of cumulating operation of the third embodiment of the present invention.

Operation for accumulating and measuring hashes at the time of occurrence of an event will now be described by reference to FIG. 10. An entry of event information occurred in the information processing terminal 10 is passed to the disclosure/nondisclosure determination section 1001. By use of policy data stored in the policy storage section, the disclosure/nondisclosure determination section 1001 determines a server to which an entry can be disclosed (a disclosure/nondisclosure determination step S201). At this time, the disclosure/nondisclosure determination section 1001 also determines the service server 4006 in the secure device 40.

The log concealing section 1002 conceals an entry from servers to which an entry is not to be disclosed (a log concealing step S202). At this time, the concealed entry is stored in the log storage section 1007.

The multi-log measurement section 1003 receives both an entry not to be concealed and a concealed entry and transmits a command for updating a plurality of cumulative hashes to the secure device 40 in accordance with a result of determination made by the disclosure/nondisclosure determination section 1001 (a multi-log measurement step S203). More specifically, a cumulative hash number and a hash are included in the command transmitted to the secure device 40, and a cumulative hash corresponding to the respective servers (including the service server 4006 in the secure device 40) is commanded to perform processing for accumulating a hash of the concealed entry, as required.

The cumulative computing section 4001 of the secure device 40 receives the command including the hash and the cumulative hash number and updates a corresponding cumulative hash. The cumulative hash is stored in the cumulative hash storage section 4003 (a cumulative operation processing step S204).

Figure 11:
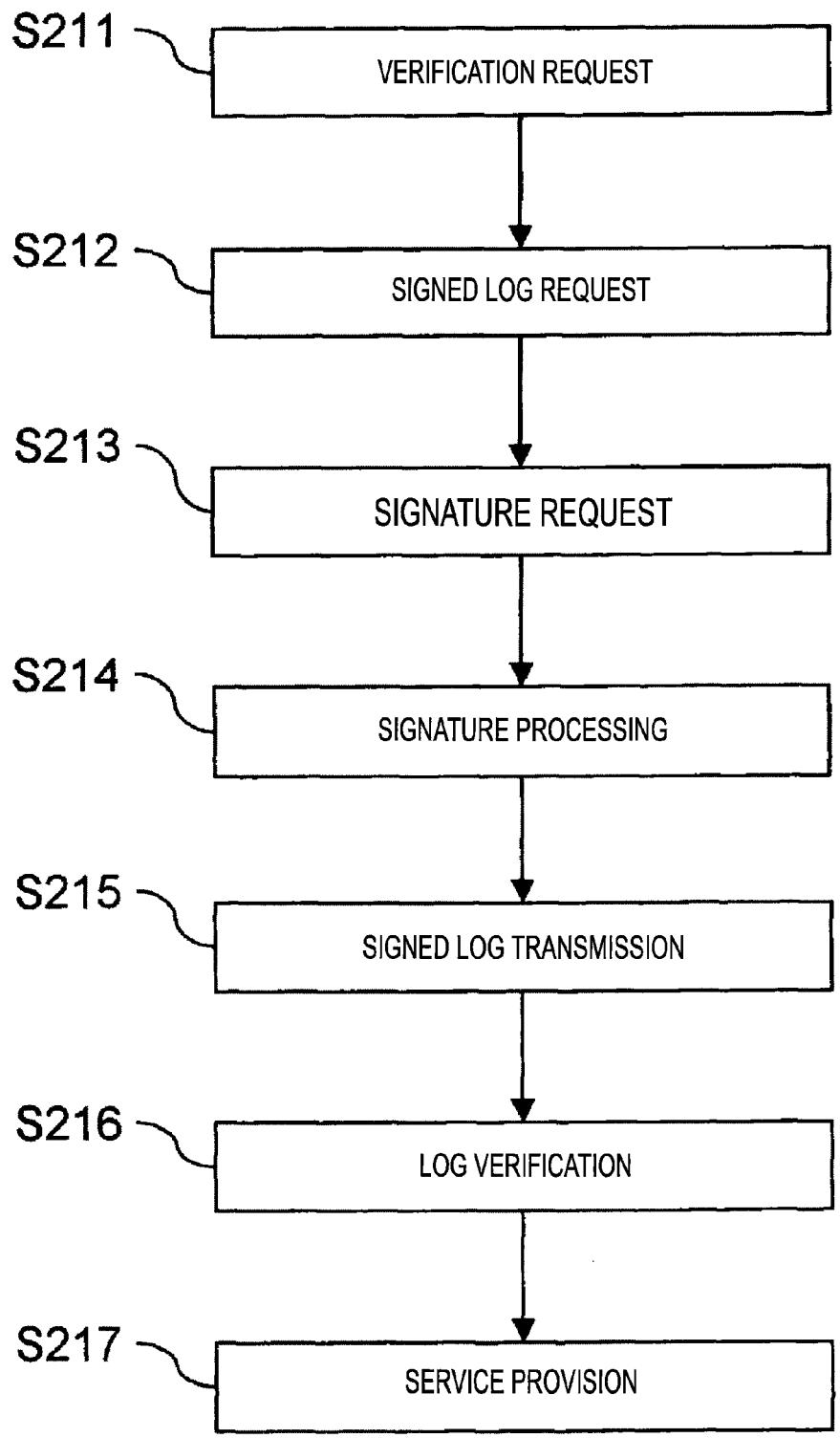
FIG. 11 is a descriptive view of notifying operation of the third embodiment of the present invention.

By reference to FIG. 11, operation by means of which the service client sends a status notification to the service server will now be described. The service client 1011 requests the verification request section 1005 to perform verification (a verification request step S211).

The verification request section 1005 requests a signed log from the log configuration section 1004 (a signed log request step S212). The log configuration section 1004 extracts a corresponding entry from the log storage section 1007; subjects the entry to concealment processing, as necessary, and constitutes a log corresponding to the server to be notified; and requests a signature processing to the signature processing section 4002 (a signature request step S213).

The signature processing section 4002 computes a digital signature originating from a cumulative hash assigned a designated cumulative hash number (a signature processing step S214). Computation of the digital signature is typically operation for processing a cumulative hash by means of a signature key of the secure device 40 and performed by means of a well-known technique, such as an RSA.

The digital signature is a digital signature assigned to the cumulative hash corresponding to the re-configured log. The verification request section 1005 which has received a digital signature from the signature processing section 2002 generates a signed log, and the signed log is transmitted to the verification section 4004 (a signed log transmission step S215).

The verification section 4004 receives a signed log; first verifies a certificate; ascertains that a cumulative hash is not tampered by means of verification of a signature affixed to the cumulative hash by use of a public key included in the certificate; computes a cumulative hash from the log of a received entry; and checks the thus-computed hash against the received cumulative hash, thereby verifying that no inconsistency exists between the received cumulative hash and the log of the entry. Further, data used for verifying a log are extracted from the server DB 4005, and the log is verified (a log verification step S216).

Upon receipt of confirmation that an operating status of the service client 1011 has no problem, the service server 4006 offers a service (a service provision step S217). It is desirable that a session key be shared between the service client 1011 and the service server 4006 during the course of a series of notification-and-verification communication operations and that the session key is used for communication performed at the time of provision of a service.

As mentioned above, for instance, important personal information is previously stored in the secure device, and only a service client that has successfully performed verification is allowed to acquire and operate the personal information, whereby safe utilization of the personal information becomes feasible. Although a server function is implemented in the secure device in the present embodiment, the server function may be also implemented in an ordinary server in the network. In the above descriptions, the verification section 4004 is described as receiving a signed cumulative hash from the verification request section 1005 of the information processing terminal 10. However, the verification section 4004 may also receive a cumulative hash stored in the cumulative hash storage section 4004 by way of an internal interface in the secure device; and receive only a re-configured log from the verification request section 1005.

Fourth Embodiment

Figure 4:
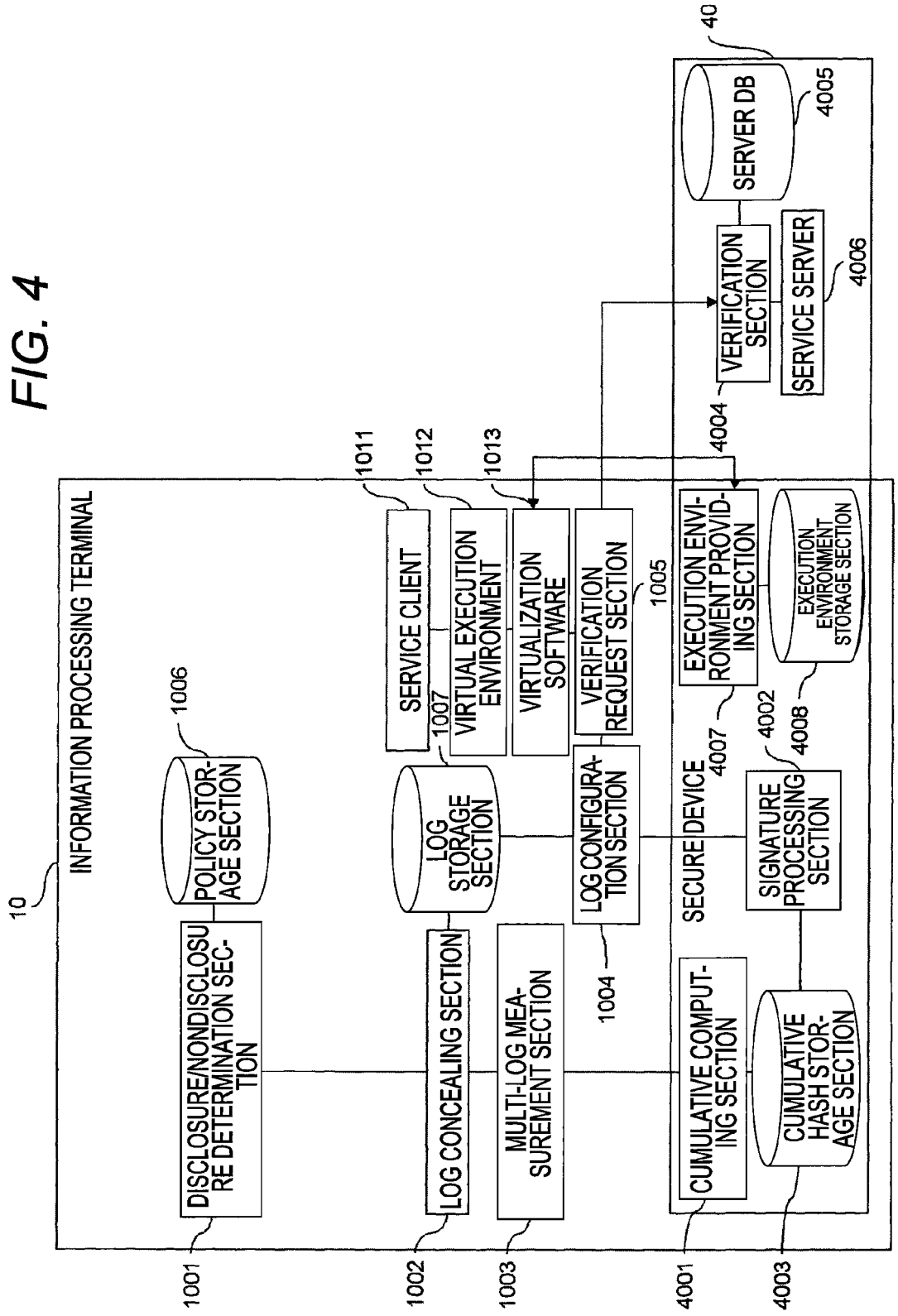
FIG. 4 is a block diagram of a fourth embodiment of the present invention.

A fourth embodiment of the present invention describes a case where the service client is executed in a virtual execution environment in the third embodiment. FIG. 4 is a block diagram of the fourth embodiment of the present invention.

In addition to including the elements of the information processing terminal of the third embodiment, the information processing terminal 10 has the virtual execution environment 1012 realized by a Kernel differing from the Kernel that has been initially started and the virtualization software 1013 that enables realization of the virtual execution environment 1012.

In addition to having the secure device of the third embodiment, the secure device 40 has an execution environment providing section 4007 that provides a virtual execution environment and execution environment storage section 4008 that stores a virtual execution environment.

Operation of the information processing terminal will now be described. After a Kernel is started as a result of activation of power of the information processing terminal 10, the virtualization software 1013 is measured and started.

The virtualization software 1013 requests an execution environment from the execution environment providing section 4007 of the secure device 40. The execution environment providing section 4007 extracts an image of a virtual execution environment from the execution environment storage section 4008 and transmits the thus-extracted image to the virtualization software 1013. And the virtualization software 1013 executes the virtual execution environment 1012. The virtual execution environment 1012 and the original execution environment are separated from each other by means of the virtualization software 1013, and the virtual execution environment and an application running therein are not directly affected by the original execution environment.

The service client 1011 is executed in the virtual execution environment 1012. At this time, the service client 1011 is also measured, but a hash differing from a cumulative hash used for measurement by the original execution environment is used for accumulation. When a plurality of service clients 1011 are executed, a plurality of accumulating operations are performed as in the third embodiment, and hashes differing from the cumulative hash used by the original execution environment are used for accumulation in this case also.

The service client running in the original execution environment provides the service server with a notification by use of the cumulative hash of the original execution environment, and the service client running in the virtual execution environment provides the service server with a notification by use of the cumulative hash of the virtual execution environment, whereby further enhancement of privacy can be attained.

The verification section 4004 verifies the notified log and ascertains contents of the log by use of data from the server DB 4005. The service server 4006 receives a result of ascertainment and determines whether or not to offer a service. For example, the service server 4006 responds solely in answer to a request from an application running in the virtual execution environment 1012 transmitted by the execution environment providing section 4007. In the present embodiment, the execution environment providing section 4007 provides only the virtual execution environment 1012, but an application that will run in the environment may also be provided. In the above descriptions, the verification section 4004 is assumed to receive a signed cumulative hash from the verification request section 1005 of the information processing terminal 10. However, the verification section may also receive a cumulative hash stored in the cumulative hash storage section 4004 by way of an internal interface in the secure device and receive only a re-configured log from the verification request section 1005.

In the present embodiment, the cumulative computing section, the cumulative hash storage section, and the signature processing section are provided solely in the secure device. However, as in the first embodiment, the information processing terminal may also be equipped with a secure module, and a partial measurement operation, such as measurement of a system, may also be realized by use of a function of the information processing terminal. Moreover, the cumulative hash held in the secure device may also be reset at the time of attachment of the secure device.

The present invention has been described in detail by reference to the specific embodiments. However, it is manifest to those skilled in the art that various alterations and modifications can be made to the invention without departing from the spirit and scope of the present invention.

The present patent application is based on Japanese Patent Application (JP-2006-171727) filed on Jun. 21, 2006, contents of which are incorporated hereby for reference.

INDUSTRIAL APPLICABILITY

The information processing terminal of the present invention enables notification of a status of an information processing terminal while protecting privacy information, so that both security and privacy can be protected. For instance, the invention can be applied to various information processing terminals; for instance, a portable cellular phone, a personal digital assistant (PDA), a personal computer, a music player (and recorder), a camera, a video camera, and the like.

The invention claimed is:

1. An information processing terminal that provides a plurality of notified parties with notification of accumulation of entries indicating data that shows a status change, the information processing terminal comprising:
   a cumulative storage section that holds respective cumulative hashes of entries corresponding to each of the plurality of notified parties, wherein the respective cumulative hashes are used for detecting tampering of a log of an entry;
   a multi-log measurement section that commands to update, on the basis of one entry, the respective cumulative hashes corresponding to the plurality of notified parties held in the cumulative storage section; and
   a verification request section that transmits to a particular notified party from the plurality of notified parties data containing data made by affixing a digital signature to a particular cumulative hash from the respective cumulative hashes held in the cumulative storage section, wherein the particular cumulative hash corresponds to the particular notified party.

2. A secure device mounted on the information processing terminal defined in claim 1, the secure device comprising:
   a cumulative storage section that holds a cumulative hash of entries indicating data for showing a change in a status of the information processing terminal;
   a cumulative calculation section that updates the cumulative hash of the entries held in the cumulative storage section;
   a signature processing section that signs the cumulative hash of the entries digitally;
   a verification section that verifies the data received from the information processing terminal; and
   a service server that offers a service when verification of the data performed by the verification section becomes successful.

3. The secure device according to claim 2, wherein the verification section receives the cumulative hash of the entries held by the cumulative storage section by way of an internal interface of the secure device.

4. The secure device according to claim 2, further comprising:
   an execution environment providing section that provides an execution environment; and
   an execution environment storage section that stores an execution environment.

5. The information processing terminal according to claim 1, further comprising:
   a verification section that verifies the data received from the verification request section; and
   a service server that offers a service when verification of the data performed by the verification section becomes successful.

6. The information processing terminal according to claim 5, wherein the verification section receives the cumulative hash of the entries held by the cumulative storage section by way of an internal interface without involvement of the verification request section.

7. An information processing terminal that provides a plurality of notified parties with notification of accumulation of entries indicating data that shows a status change, the information processing terminal comprising:
   a disclosure/nondisclosure determination section that determines whether or not notification of entry is allowed for each notified party;
   a log concealing section that generates a concealed entry;
   a log storage section for storing an entry;
   a cumulative storage section that holds accumulation of entries used for detecting tampering of a log for each notified party;
   a multi-log measurement section that commands, on the basis of a result of determination made by the disclosure/nondisclosure determination section:
      to update accumulation of entries held by the cumulative storage section corresponding to a notified party for which the notification of entry is not allowed on the basis of the concealed entry; and
      to update accumulation of entries held by the cumulative storage section corresponding to a notified party for which the notification of entry is allowed on the basis of an unconcealed entry;
   a log configuration section that generates, on the basis of the result of determination made by the disclosure/nondisclosure determination section, a log to be sent to a notified party among the entries stored in the log storage section in such a way that:
      an entry which cannot be notified to the notified party becomes the concealed entry; and
      an entry which can be notified to the notified party becomes the unconcealed entry; and
   a verification request section that transmits, to the notified party, both data with a digital signature to accumulation of entries held by the cumulative storage section corresponding to a notified party and data containing the log generated by the log configuration section.

8. The information processing terminal according to claim 7, wherein the log concealing section holds a master key to generate an encryption key from data generated by encrypting an entry ID with the master key and encrypt the entry with the encryption key.

9. The information processing terminal according to claim 7,
   wherein the log concealing section randomly generates an encryption key to encrypt the entry with the encryption key, and
   the information processing terminal further comprises a concealing information storage section for storing the encryption key as concealing information.

10. The information processing terminal according to claim 7, wherein the log concealing section deletes a part or entirety of content of the entry.

11. The information processing terminal according to claim 7, further comprising:
   an ID assigning section that assigns a different entry ID for each entry;
   a concealing information storage section for storing concealing information about concealment of the each entry in association with the entry ID; and
   a log disclosure determination section that, when disclosure of a concealed entry is requested, acquires or generates information, in correspondence with the entry ID, for releasing concealment, that determines whether or not to disclose the entry to a party that has made a request, and that passes the information for releasing the concealment or the entry released from the concealed state when determining the party to be eligible for disclosure.

12. The information processing terminal according to claim 11, wherein the log disclosure determination section submits the entry, which is released from the concealed state, to a user when determining whether or not to disclose the entry, thereby causing the user to designate whether or not to disclose the entry.

13. An information processing terminal that provides a plurality of notified parties with notification of accumulation of entries indicating data that shows a status change, the information processing terminal comprising:
- a cumulative storage section that holds accumulation of entries used for detecting tampering of a log of an entry for each of the plurality of notified parties;
- a multi-log measurement section that commands to update, on the basis of one entry, a plurality of the accumulation of entries corresponding to the plurality of respective notified parties held in the cumulative storage section; and
- a verification request section that transmits to the notified party data containing data made by affixing a digital signature to the accumulation of entry held in the cumulative storage section corresponding to the notified party, wherein when the notified parties differ from each other, the cumulative storage section holds a single piece of accumulation of entries in a case where cumulative values of the entries corresponding to the notified parties are equal to each other, and the single piece of accumulation of the entries is copied and pieces of the accumulation of the entries are individually updated, and the cumulative storage section holds the plurality of pieces of individually-updated accumulation of entries in a case where cumulative values of the entries corresponding to the notified parties become differed from each other.

14. A status notification method in which an information processing terminal notifies a server of a log that is a history of a change in status of own terminal, the method comprising:
- generating the log while concealing an entry for a server to which the entry is not allowed to be notified;
- generating a cumulative hash for the server corresponding to the log, wherein the cumulative hash is generated as a function of the entry being concealed or unconcealed for the server;
- generating a signed log that is a concatenation of the log, data generated by affixing a digital signature to the cumulative hash corresponding to the log, and a certificate for verifying the digital signature; and
- transmitting the signed log to the server.

* * * * *